(12) United States Patent
Kawai

(10) Patent No.: US 8,240,125 B2
(45) Date of Patent: Aug. 14, 2012

(54) THRUST VECTORING SYSTEM AND METHOD

(75) Inventor: Ronald Tatsuji Kawai, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 1064 days.

(21) Appl. No.: 11/828,380

(22) Filed: Jul. 26, 2007

(65) Prior Publication Data

US 2009/0026283 A1  Jan. 29, 2009

(51) Int. Cl.
*F02K 1/00* (2006.01)
*B63H 25/46* (2006.01)
*B63H 11/10* (2006.01)

(52) U.S. Cl. .. 60/231; 60/770; 239/265.17; 239/265.19; 239/265.23

(58) Field of Classification Search ............... 60/230, 60/231, 232, 770–771; 239/265.17, 265.19, 239/265.23, 265.35
See application file for complete search history.

(56) References Cited

U.S. PATENT DOCUMENTS

| | | | |
|---|---|---|---|
| 1,795,035 A | | 3/1931 | Pellissier |
| 2,838,909 A | * | 6/1958 | Meulien .................. 239/265.23 |
| 2,850,977 A | | 9/1958 | Pollak |
| 2,969,017 A | | 1/1961 | Kershner |
| 3,024,602 A | * | 3/1962 | Bertin et al. ............. 239/265.17 |
| 3,051,413 A | | 8/1962 | Pouit |
| 3,073,630 A | | 1/1963 | Kuhn |
| 3,090,198 A | | 5/1963 | Zeisloft |
| 3,140,584 A | | 7/1964 | Ritchey et al. |
| 3,200,587 A | | 8/1965 | Tolson |
| 3,230,708 A | | 1/1966 | Huang et al. |
| 3,266,244 A | | 8/1966 | Schulze et al. |
| 3,270,505 A | | 9/1966 | Crabill et al. |
| 3,392,918 A | | 7/1968 | Goldberg |

(Continued)

OTHER PUBLICATIONS

Kim, Hyun D., Berton, Jeffrey J. and Jones, Scott M. "Low Noise Cruise Efficient Short Take-Off and Landing Transport Vehicle Study," NASA/TM-2007-214659, AIAA-2006-7738, Feb. 2007, 16 pages.

(Continued)

*Primary Examiner* — William H Rodriguez
*Assistant Examiner* — Young Choi
(74) *Attorney, Agent, or Firm* — Harness, Dickey & Pierce, P.L.C.

(57) ABSTRACT

A method and system for thrust vectoring a primary fluid flow from an exhaust nozzle of a jet engine that significantly increases the non-axial force able to be generated by a flight control surface associated with the nozzle. In one implementation the method involves placing a flight control element having a movable portion adjacent a downstream edge of the nozzle. A secondary fluid flow is created adjacent a surface of the flight control element that influences a boundary layer of the primary fluid flow over the flight control element. This causes the primary fluid flow to generate a force that is directed non-parallel (i.e., non-axial) to a longitudinal axis of the nozzle. In one specific implementation a plurality of slots are formed in the flight control surface, and the flight control surface is formed by an airfoil. In another implementation the flight control surface is formed on an interior wall of the nozzle at a downstream edge of the nozzle. In various implementations either a pressurized secondary fluid flow can be directed out through the slot, or a vacuum force can be generated through the slot to either promote attachment or separation of the primary fluid flow passing over the flight control surface.

14 Claims, 4 Drawing Sheets

U.S. PATENT DOCUMENTS

| | | | |
|---|---|---|---|
| 3,756,542 | A | 9/1973 | Bertin et al. |
| 3,938,760 | A | 2/1976 | Hoppner et al. |
| 3,945,573 | A | 3/1976 | Burgess et al. |
| 4,005,823 | A * | 2/1977 | Thayer ............ 239/265.37 |
| 4,019,696 | A | 4/1977 | Hirt et al. |
| 4,030,687 | A | 6/1977 | Hapke |
| 4,037,405 | A * | 7/1977 | Huenniger et al. ............ 60/229 |
| 4,044,971 | A | 8/1977 | Pharris |
| 4,098,076 | A * | 7/1978 | Young et al. ............ 60/230 |
| 4,350,297 | A | 9/1982 | Martin et al. |
| 4,392,621 | A | 7/1983 | Viets |
| 4,398,683 | A | 8/1983 | Schmetzer |
| 4,478,378 | A | 10/1984 | Capuani et al. |
| 4,482,108 | A | 11/1984 | Sutton |
| 4,537,026 | A * | 8/1985 | Nightingale ............ 60/264 |
| 4,892,253 | A | 1/1990 | Speicher et al. |
| 4,969,614 | A | 11/1990 | Capuani et al. |
| 5,082,181 | A * | 1/1992 | Brees et al. ............ 239/265.35 |
| 5,098,034 | A | 3/1992 | Lendriet |
| 5,505,408 | A | 4/1996 | Speicher et al. |
| 5,630,564 | A | 5/1997 | Speicher et al. |
| 5,662,290 | A | 9/1997 | Voigt |
| 5,758,844 | A | 6/1998 | Cummings |
| 5,887,821 | A | 3/1999 | Voigt et al. |
| 6,298,658 | B1 * | 10/2001 | Bak ............ 60/231 |
| 6,315,239 | B1 | 11/2001 | Voigt |
| 6,543,718 | B2 | 4/2003 | Provost et al. |
| 6,679,048 | B1 | 1/2004 | Lee et al. |
| 6,926,229 | B2 | 8/2005 | Cummings et al. |
| 7,216,476 | B2 | 5/2007 | Fink |
| 2006/0242942 | A1 | 11/2006 | Johnson |
| 2007/0095972 | A1 | 5/2007 | Buffenoir et al. |
| 2007/0271901 | A1 * | 11/2007 | Gustafsson et al. ............ 60/230 |
| 2009/0064660 | A1 * | 3/2009 | Toffan et al. ............ 60/232 |

OTHER PUBLICATIONS

Stone, James R., Krejsa, Eugene A., Berton, Jeffrey A. and Kim, Hyun Dae. "Initial Noise Assessment of an Embedded-Wing-Propulsion Concept Vehicle," AIAA 2006-4979, Jul. 2006.

Reed, D. H., Sen, R., Blackner, A. M., Yee, P. and Sroker, R. W. "Airframe Noise Generation and Radiation," D6-81956TN, Jan. 16, 1997.

Dobrzynski, W, Chow, L.C., Guion, P. and Shiells, D. "A European Study of Landing Gear Airframe Noise Sources," AIAA-2000-1971, Jun. 2000.

Dunn, D. G. and Peart, N. A. "Aircraft Noise Source and Contour Estimation," NASA CR-114649, Oct. 1973, 240 pages.

Liebeck, R. H., Oage, M. A. and Rawdon, B. K., "Blended Wing Body Subsonic Commercial Transport," AIAA 98-0438, Jan. 1998, 12 pages.

Reddy, N. N., Blakney, D. F., Tibbets, J. G. and Gibson, J. S. "V/STOL Aircraft Noise Prediction (Jet Propulsors)," Report No. FAA-RD-75-125, Jun. 1975, 327 pages.

"Innovative Aircraft Yaw Control Effectors for Blended Wing Body Aircraft" Boeing submittal to NASA Fundamental Aeronautics Program, Subsonic Fixed Wing Project Request for Information on innovative yaw control concepts for subsonic aircraft, reference No. NNL07YAWCONL, Dec. 12, 2006, pp. 1-6.

Liebeck, R. H. "Design of the Blended-Wing-Body Subsonic Transport," 2002 Wright Brothers Lecture, AIAA-2002-0002, 23 pages.

vonGlahn, U, Groesbeck, D. and Reshotko, M. "Geometry Considerations for Jet Noise Shielding with CTOL Engine-Over-The-Wing Concept," AIAA Paper No. 74-568, 1974, 41 pages.

vonGlahn, U. and Groesback, D. "Influence of Mixer Nozzle Velocity Decay Characteristics on CTOL-OTW Jet Noise Shielding" NASA TM X-71631, 19 pages.

vonGlahn, U, Goodykoontz, J. and Wagner, J. "Nozzle Geometry and Forward Velocity Effects on Noise for CTOL Engine-Over-The-Wing Concept," NASA TM X-71453, 30 pages.

Harkonen, D. L., McBride, J. F. and O'Keefe, J. V., "Noise and Static Performance Characteristics of a STOL Aircraft Jet Flap," NASA CR-137581, Dec. 1974, 64 pages.

Gray, V. H., Gutierrez, O. A. and Walker, D. Q. "Assessment of Jets as Acoustic Shields by Comparison of a Single and Multitube Suppressor Nozzle Data," AIAA 73-1001, pp. 1-20.

Kinzie, K. W., Schein, D. B. and Soloman JR, W. D. "Experiments and Analyses of Distributed Exhaust Nozzles," AIAA 2002-2555, Jun. 2002, pp. 1-11.

YC-14 Ground and Flight Experiments for NASA Flight Test Final Report, Boeing Document No. D748101132, Sep. 1997, 3 pages.

Rydman, M. R. "YC-14 Flyover Noise-Comparison of Predicted and Measures Characteristics," D6-48039.

Sommers, J. E. and Bohn, A. J. "QSRA Flight Test-Noise," Boeing Document No. D340-10700, Jan. 1979, 3 pages.

Gerhold, C. H., Clark, L. R., Dunn, M. H. and Tweed, J. "Investigation of Acoustical Shielding by a Wedge-Shaped Airframe," AIAAA 2004-2866, 2004, pp. 1-18.

Hill, G. A., Brown, K.A., Geiselhart, K. A. and Burg, C. M. "Integration of Propulsion-Airframe-Aeroacoustic Technologies and Design Concepts for a Quiet Blended-Wing-Body Transport," AIAA 2004-6403, Sep. 2004, pp. 1-20.

Papamoschou, D. and Shupe, R.S. "Effect of Nozzle Geometry on Jet Noise Reduction Using Fan Flow Deflectors," AIAA-2006-2707, May 2006, pp. 1-20.

Papamoschou, D. "Fan Flow Deflection in Simulated Turbofan Exhaust," AIAA Journal, vol. 44, No. 12, 2006, pp. 3088-3097.

Zaman, K., Bridges, J. and Papamoschou, D. "Offset Stream Technology—Comparison of Results from UCI and GRC Experiments," AIAA-2007-0438, Jan. 2007, 14 pages.

Wassom, Steve R. and Faupell, Lawrence E. "Integrated Aerofin/Thrust Vector Control for Tactical Missiles," Journal of Propulsion, vol. 7, No. 3, May-Jun. 1991, pp. 374-381.

* cited by examiner

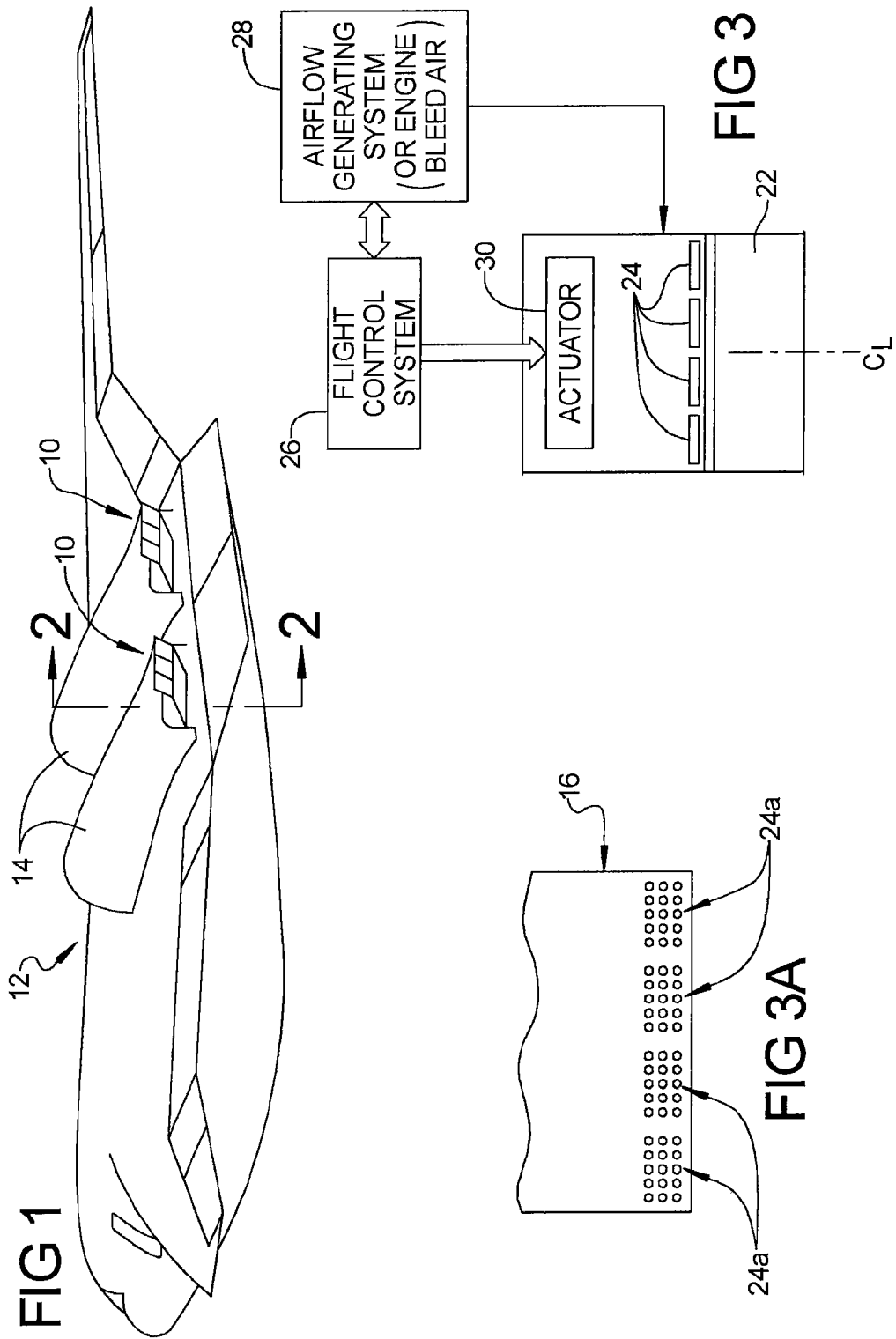

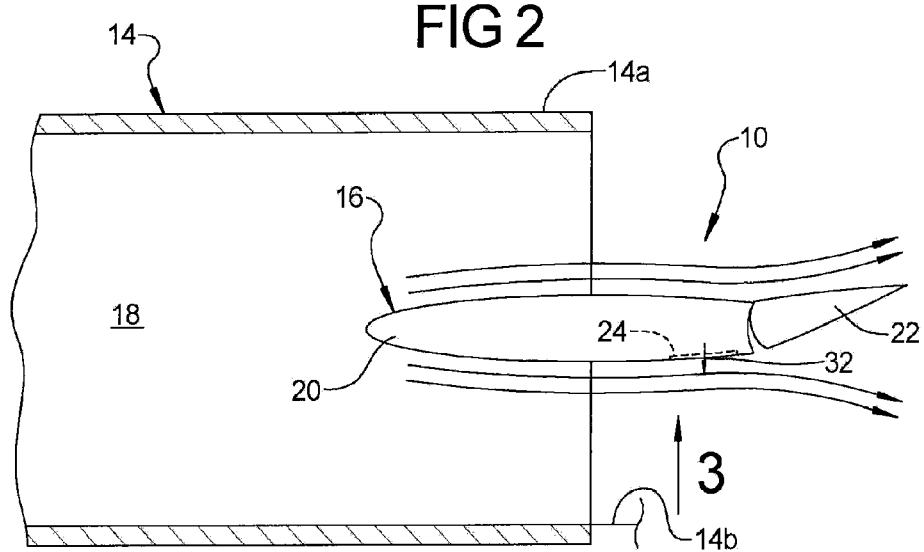
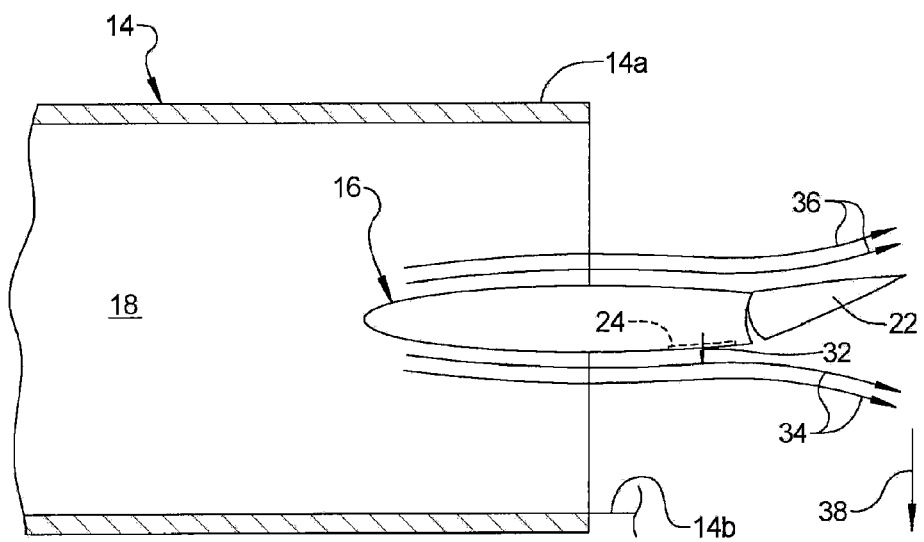

THRUST VECTORING SYSTEM AND METHOD

FIELD

The present disclosure relates to thrust vectoring systems and methods, and more particularly to a thrust control system and method employing a flow control element or surface that makes use of a secondary flow to enhance turning of an exhaust flow from a jet engine, to thus generate large non-axial side forces using low levels of secondary power for rapid response.

BACKGROUND

The statements in this section merely provide background information related to the present disclosure and may not constitute prior art.

Thrust vectoring of a jet engine exhaust flow has typically required deflecting or rotating the entire exhaust nozzle outer flow path to generate non-axial forces that can be used to help create lift or to control flight and/or an attitude of an aircraft. Thrust vectoring has also involved using fluid flow control systems that are applied to the outer periphery of convergent-divergent exhaust nozzles for control of supersonic aircraft. However, the use of convergent-divergent nozzles would entail large performance penalties for subsonic aircraft that have either convergent exhaust nozzles or only slightly convergent-divergent exhaust nozzles. Thus, present day flow control systems are generally limited in application to supersonic aircraft.

Different types of aircraft may also require particularly complex flight control systems to achieve needed degrees of maneuverability and control. For example, aircraft of the "flying wing" type or aircraft making use of a hybrid wing often make use of canards or empennages. However, such structures often add significant weight to the aircraft, and may require a significant amount of secondary power to be used with the flight control system. A more effective system for controllably generating non-axial forces that can be used to control the attitude and/or flight of an aircraft, and which can be implemented on both supersonic and subsonic aircraft, would be highly desirable.

SUMMARY

A method and system for thrust vectoring a primary fluid flow, for example an exhaust flow, leaving a nozzle of a jet engine. In one implementation the method involves placing a flight control surface adjacent a downstream edge of the nozzle. A secondary fluid flow is created adjacent the flight control surface that influences a boundary layer of the fluid flow over the flight control surface, to generate a force that is directed non-parallel to a longitudinal axis of the nozzle (i.e., a non-axial force), and that is significantly greater in magnitude than what could be achieved without the secondary flow. The non-parallel force acts as a thrust vectoring force that can assist in controlling the flight and/or attitude of an airborne mobile platform with which the jet engine is being used. In various embodiments the secondary fluid flow may be continuous or intermittent.

In one specific implementation the flight control surface forms an airfoil having a fixed component and a moveable component. At least one slot is formed in the airfoil. An actuator controls movement of the moveable component, which in one example is a flap. A secondary airflow may be directed through the slot to influence attachment or separation of the boundary layer of the primary flow over the airfoil, depending on the direction of the secondary airflow relative to the outer surface of the airfoil. In various embodiments a plurality of slots are employed on the fixed component of the airfoil to generate secondary airflows adjacent an outer surface of the airfoil. The secondary airflows may be directed either normal or tangential to an outer surface of the airfoil, to thus selectively enhance separation or attachment, respectively, of a boundary layer of the primary flow moving over the flap.

In one specific implementation a suction force is generated through the slot in the flight control surface that promotes attachment (i.e., helps to prevent separation) of the boundary layer from the flight control surface.

In another embodiment the flight control surface forms an interior wall of the nozzle. The flight control surface may further be oriented to generate a non-axial directed force that influences either the yaw, pitch or even roll of an airborne mobile platform.

BRIEF DESCRIPTION OF THE DRAWINGS

The drawings described herein are for illustration purposes only and are not intended to limit the scope of the present disclosure in any way.

FIG. 1 is a perspective view of a blended wing body aircraft having a pair of exhaust nozzles and employing an embodiment of a thrust vectoring system of the present disclosure with each exhaust nozzle;

FIG. 2 is a partial cross sectional view taken in accordance with section line 2-2 in FIG. 1 illustrating in more detailed fashion one of the exhaust nozzles and its associated thrust vectoring system;

FIG. 3 is a bottom plan view of the flight control surface shown in FIG. 2, in this example an airfoil, taken in accordance with directional arrow 3 in FIG. 2, and also illustrating the plurality of slots formed therein through which secondary airflows can be formed, together with exemplary subsystems for controlling a moveable flap of the airfoil and the secondary airflows;

FIG. 3A is a simplified plan view of an embodiment of the flight control surface of FIG. 3, but incorporating a plurality of small openings that collectively form sections of porous surfaces through which the secondary flow can be generated;

FIG. 4 is a simplified side view of the airfoil illustrating how a pressurized secondary airflow directed outwardly through the slots, normal to the outer surface of the airfoil, can facilitate flow separation of an exhaust flow (i.e., primary flow) leaving the nozzle;

DETAILED DESCRIPTION

Figure 5:
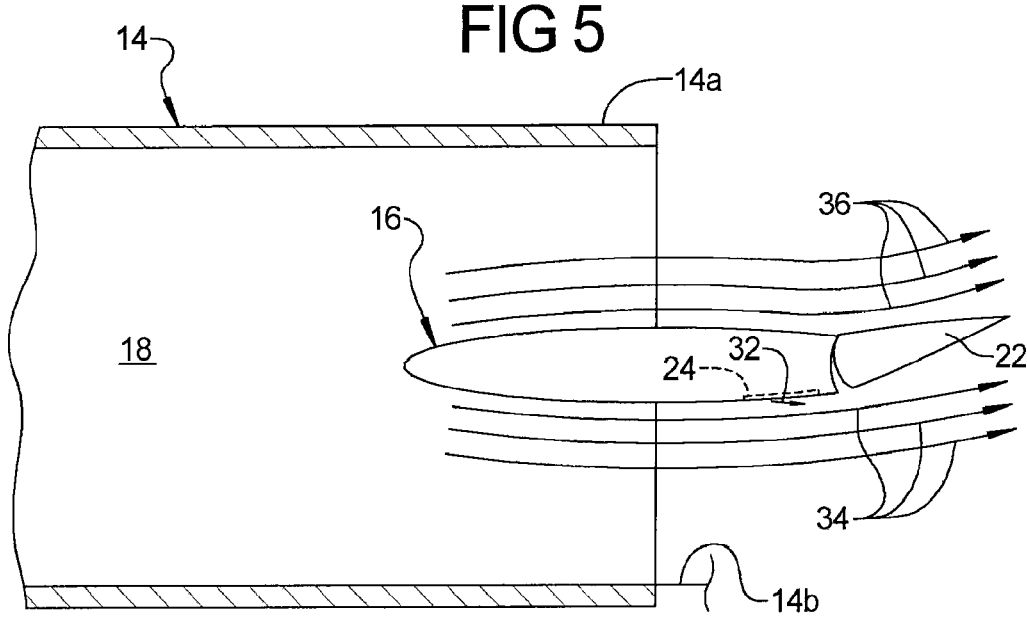
FIG. 5 is a view of the flight control element of FIG. 4, but with a pressurized, tangential secondary airflow being emitted from the slot, and illustrating how the tangential secondary airflow facilitates maintaining the boundary layer of the exhaust flow attached to the moveable flap of the airfoil.

The following description is merely exemplary in nature and is not intended to limit the present disclosure, application, or uses.

Referring to FIG. 1, a blended wing body aircraft 12 is shown incorporating a thrust vectoring system 10 within each of its exhaust nozzles 14. It will be appreciated that the exhaust nozzles 14 are each associated with a jet engine, which is not shown in the figure. It will also be appreciated that while a jet aircraft is illustrated, that the system 10 may be used with any jet powered mobile platform, for example a missile or an unmanned airborne mobile platform. The system may also find utility in a jet powered land vessel or marine vessel, although it is anticipated that most applications are likely to involve airborne, jet powered mobile platforms.

Referring further to FIGS. 1 and 2, the system 10 includes a flight control surface 16 which is mounted preferably at least partially within an interior area 18 of the nozzle 14. The flight control surface may form a vane, an airfoil or any similar flight control element. For convenience, the flight control surface will be referred to throughout the following description as "airfoil 16".

The airfoil 16 may be mounted either centrally within the nozzle 14 or at a location that is offset toward either the upper wall 14a of the nozzle 14 or toward a surface 14b of the fuselage of the aircraft 12 that forms a bottom wall for the nozzle 14. It is anticipated that in most applications it will be preferred to mount the airfoil 16 at a midpoint (cord-wise) of the nozzle 14 as shown in FIG. 2.

The airfoil 16 includes a fixed component 20 and a movable component in the form of a flap 22. The flap 22 is controlled by a flight control system of the aircraft 12, as well an actuator, which will each be discussed in the following paragraphs. The fixed component 20 of the airfoil 16 is preferably secured entirely or mostly within the nozzle 14 adjacent a downstream edge (flow-wise) 14c of the nozzle 14. The airfoil 16 may be secured within the nozzle 14 by any suitable structure, for example by direct attachment to the interior wall of the nozzle 14 or by an internal spar. However, the installation of the airfoil 16 is preferably such that the entire flap 22 is disposed outside of the nozzle 14.

Referring to FIG. 3, the airfoil 16 can be seen to include a plurality of slots 24 oriented to extend normal to a longitudinal axis $C_L$ of the airfoil 16. However, the slots 24 could instead take other shapes such as, for example, circular, oval or square shapes. As shown in FIG. 3A, one embodiment of the airfoil 16 may alternatively make use of a plurality of small openings to form porous surface sections 24a through which a secondary flow may be generated.

Slots 24 may be oriented tangential or non-parallel to the longitudinal axis $C_L$, and they could be slightly curved rather than straight. However, it is anticipated that in many applications, straight slots formed normal to the longitudinal axis $C_L$ will be preferred. The elongated slots 24 may have heights and widths that vary to suit the needs of specific applications. The heights and widths of the slots 24 will also depend on the size of the nozzle 14 being used. However, it is anticipated that at least in some applications, the slots 24 may have lengths on the order of six to twelve inches (15.24-30.48 cm) and widths of about 0.2-0.4 inch (5.08 mm-10.16 m). The lengths of the slots 24 may all be the same, or some of the slots can be made shorter or longer in length to best tailor performance to meet a specific application. The spacing between the slots 24 may be uniform or may also vary slightly to best meet the needs of a specific application. Alternatively, it is possible that a single slot spanning a major portion of the length of the airfoil 16 may be employed.

The overall number and size of the slots 24 formed on the airfoil 16 will also depend on the needs of the particular application (e.g., type of mobile platform, exact engine and engine thrust rating, non-axial force required, etc.), and the overall dimensions of the airfoil 16. The slots 24 can also be formed on both the upper and lower surfaces of the airfoil 16 to provide bidirectional thrust vectoring control.

With further reference to FIG. 3, the system 10 further includes a flight control system 26 and a secondary airflow generating system 28. The secondary airflow generating system 28 is used to generate either a pressurized secondary airflow or a vacuum force that is directed through the slots 24. The secondary flow may also be continuous or intermittent. It may also be a pulsating flow that oscillates between pressure and suction. Engine bleed air from the jet engine of the aircraft 12 could also be employed to form the pressurized secondary airflow.

The airfoil 16 further may include an actuator 30 and suitable linkage (not shown) for moving the flap 22 of the airfoil 16. The actuator 30 may be controlled by the flight control system 26 so that the flap 22 is turned in a desired direction to assist in turning the fluid flow exiting the nozzle 14. The term "primary fluid flow" will be understood to include any fluid flow that is leaving the exhaust nozzle 14 that is generated by the engine or one of its related components. The primary fluid flow may comprise a fan bypass flow, an engine exhaust flow, or a combination thereof.

The pressurized secondary airflow being emitted through each of the slots 24 is indicated by arrow 32 in FIG. 2. The secondary airflow 32 may be directed generally normal to the exterior surface of the airfoil 16, as indicated in FIG. 2, or it may be directed generally tangential to the exterior surface of the airfoil 16 or at an angle. Suitable structure is formed within the airfoil 16, for example pivotally mounted airflow nozzles or one or more air deflecting panels (not shown), that may be used to direct the secondary airflow either normal or tangential, or at some intermediate angle, to the exterior surface of the airfoil 16. Alternatively, the angle at which the secondary airflow is directed may be controlled by a pivoting trailing edge member associated with each elongated slot 24.

As will be described further in the following paragraphs, emitting the secondary airflow 32 generally normal to the exterior surface of the airfoil 16 facilitates separation of the boundary layer of the exhaust flow (i.e., the "primary flow") from the flap 22, while directing the secondary airflow 32 tangential to the exterior surface of the airfoil 16 facilitates maintaining attachment of the boundary layer to the flap 22.

Referring to FIG. 4, the operation of the system 10 will now be described. In FIG. 4 the slots 24 are used to generate the secondary pressurized airflow 32 in a direction generally normal to the exterior surface of the airfoil 16. This causes separation of the boundary layer exhaust flow from the lower surface of the airfoil 16, as indicated by exhaust flow arrows 34. The position of the flap 22 facilitates attachment of the boundary layer flow along its upper surface, as indicated by exhaust flow arrows 36. Since in this example the airfoil 16 is oriented horizontally within the nozzle 14, the airfoil 16 will produce a force in accordance with arrow 38 that will provide an aircraft nose up pitch force when the nozzle 14 is located aft of the aircraft's 12 center of gravity.

In FIG. 5, the pressurized secondary airflow 32 is directed generally tangentially to the exterior surface of the airfoil 16. This facilitates attachment of the boundary layer of the exhaust flow, as indicated by exhaust flow arrows 36. This enables a larger deflection of the flap 22 without separation of the boundary layer, thus resulting in a considerably larger, non-axial force being developed.

Figure 6:
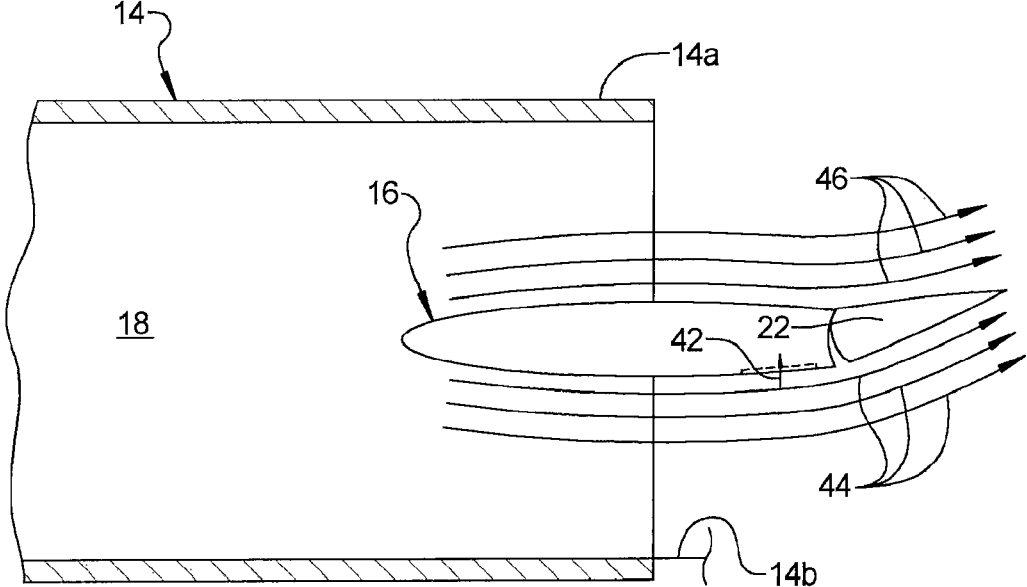
FIG. 6 is a view of the airfoil of FIG. 4 illustrating a vacuum force being generated through the slot, which helps to facilitate maintaining attachment of the boundary layer of the exhaust flow to the flap of the airfoil.

In FIG. 6, a suction force 42 is generated through each of the slots 24. This facilitates attachment of the boundary layer of the exhaust flow as it moves over the flap 22, as indicated by exhaust flow arrows 44. Exhaust flow arrows 46 indicate that the exhaust flow remains attached to airfoil 16 as it moves over the flap 22. This action also allows a much larger flap 22 deflection to create a much larger non-axial force. The use of the secondary airflow 32 in FIGS. 4, 5 and 6 reduces the size of the airfoil 16 needed to produce a given level of non-axial force, and further allows changing the side force by controlling the secondary flow to enable rapid changes in the side force without rapid flap excursions.

Figure 7:
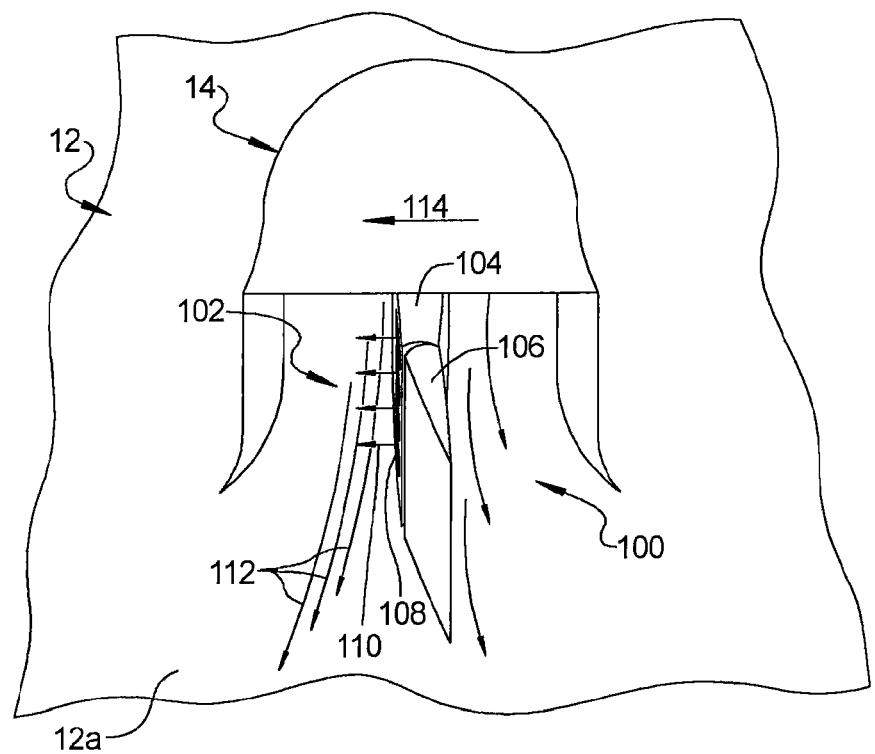
FIG. 7 is a perspective end view of the nozzle shown in FIG. 1, but with a flight control surface, in this example an airfoil, disposed at a central location within the nozzle and generating a pressurized secondary airflow in a direction normal to the outer surface of the airfoil, and with the airfoil being oriented vertically so that the exhaust flow is turned to effect a yaw force.

Referring now to FIG. 7, another embodiment of the present disclosure is illustrated in which a thrust vectoring system 100 includes a vertically oriented flight control surface, in this example an airfoil 102, disposed within the nozzle 14. The airfoil 102 has a fixed component 104 and a moveable component in the form of flap 106. The airfoil 102 may otherwise be identical in construction to airfoil 16, and includes a plurality of slots 108 on at least one exterior surface of the fixed component 104 of the airfoil 102. The only difference between the system 100 and the system 10 is that with system 100 the airfoil 102 is oriented vertically rather than horizontally within the nozzle 14. When pressurized secondary airflows 110 are directed out through the slots 108 normal to the exterior surface of the airfoil 102, they cause separation of the boundary layer of the exhaust flow from the flap 106, as indicated by exhaust flow arrows 112. This produces a non-axial directed force in accordance with arrow 114. The non-axial force effectively acts to influence or control the yaw of the aircraft 12. Similar to the system 10, the system 100 could readily be modified to generate a tangentially directed flow out from the slots 108 or a vacuum force through the slots 108. The slots 108 could also be formed on both opposing surfaces of the airfoil 102.

Figure 8:
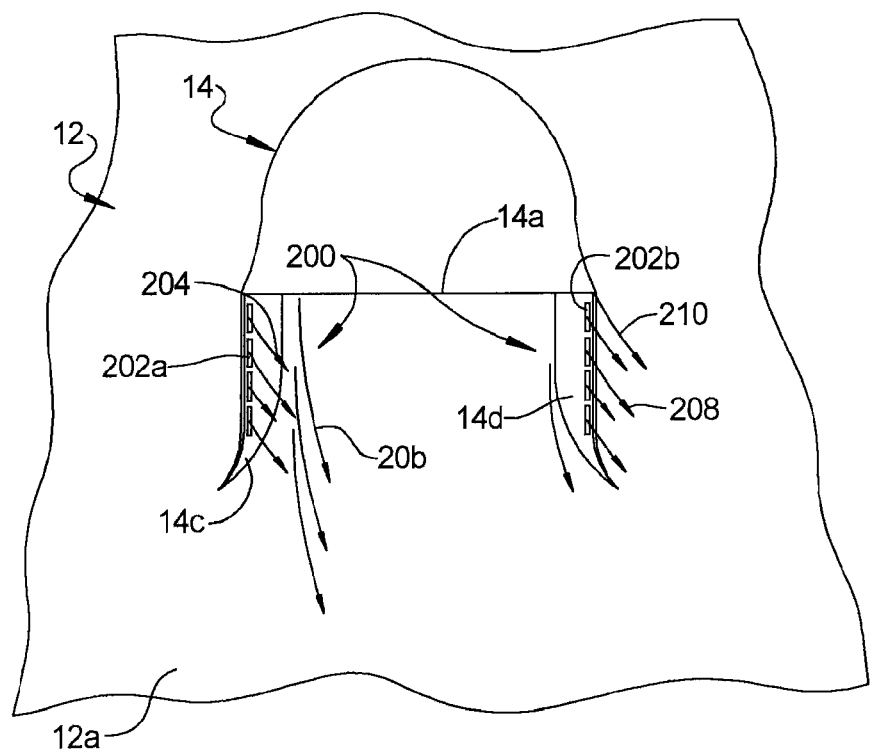
FIG. 8 is a view of the exhaust nozzle of FIG. 7 but with the inner surface of the exhaust nozzle forming a flight control surface with a plurality of slots for generating either a tangential secondary flow, a flow normal to the inner surface, or a vacuum force through the slots, to selectively effect turning of the exhaust flow.

Referring now to FIG. 8, another embodiment of the present disclosure is illustrated in which a thrust vectoring system 200 is formed on interior walls 14c and 14d of the nozzle 14. The system 200 includes pluralities of slots 202a and 202b through which secondary airflows can be emitted adjacent a downstream edge 14a of the nozzle 14. In FIG. 8, pressurized, secondary airflows 204 emitted through the slots 202a are generated generally normal to the interior wall 14c of the nozzle 14, which in turn facilitates separation of the boundary layer of the exhaust flow from the interior wall 14c, as indicated by exhaust flow arrows 206. However, slots 202b on interior wall 14d emit generally tangentially directed pressurized secondary airflows 208 that help to maintain attachment of the boundary layer of the exhaust flow on the interior wall 14d, as indicated by exhaust flow arrows 210. The secondary airflows through the slots 202a, 202b could be controlled in the opposite manner as well (i.e., normal secondary flows flowing out through slots 202b and tangential secondary flows flowing out through slots 202a). A vacuum force could also be employed with either group of slots 202a, 202b, as could intermittent and oscillating pressurized and/or vacuum secondary flows.

The use of secondary airflows with the airfoils (16, 102), as well as the interior wall mounted slots 202, may provide significant performance benefits over conventional empennages used with present day airborne mobile platforms such as jet powered aircraft. For example, the use of secondary flows to perform fan flow turning with a fan nozzle can potentially produce a yaw control force per unit surface area of the airfoil that is potentially twenty times, or possibly more, greater because of the higher dynamic pressure ("q"), and three times greater from powered lift, yielding a total factor of 60 increase in yaw control per unit surface area over conventional aerodynamic control surfaces. Using control of a secondary flow thus reduces the size of flight control surfaces and provides rapid changes minimizing the need for large, rapid response actuators for large aerodynamic control surfaces.

The various embodiments and implementations of the system and method described herein can significantly reduce system weight and volume, which in turn may reduce cost, since cost typically follows weight. Furthermore, the impact on cruise performance of an aircraft employing any one of the herein described embodiments should be minimal when engine bleed air is used. This is because the engine bleed air would only be used during non-axial force generation. Available engine bleed air is already in close proximity to the exhaust nozzle on many aircraft.

It is also contemplated that the airfoils 16 and 102 could be retractable and deployed only during low speed flight when external aerodynamic control surfaces are least effective because of low freestream dynamic pressures. If the airfoils 16 and 102 described herein are used for pitch control, there could be a potential synergistic benefit of reducing flyover noise.

The various embodiments of the present disclosure described herein may have particular utility with blended wing body (BWB) aircraft. Such aircraft are "tailless" and, as such, present additional challenges in implementing roll, pitch and yaw control. Although the moment arm produced from a nozzle employing the teachings presented herein may potentially be less than that produced by outer wing tip drag or vertical surface devices, the lift force from the higher dynamic pressure (i.e. "q") that results from using flow control in the nozzle may potentially result in a surface force that is orders of magnitude greater than conventional control surfaces positioned in freestream. Aerodynamic flight control and lift surfaces typically have force coefficients of 0.5 to 3.0. But using flow control can induce super circulation to generate a lift force of up to, or possibly even greater than, 9.

This various embodiments of the present disclosure described herein can be used in high bypass ratio turbofan engines for subsonic cruise aircraft. The various embodiments can also be used for roll control of a jet powered airborne mobile platform or even to create lift to reduce aircraft take-off and landing distances. Various synergistic combinations of roll, pitch and yaw control for an airborne mobile platform could be implemented using the teachings of the present disclosure. If used to create lift, the embodiments of the systems described herein may enhance the capability of otherwise conventional aircraft in performing short take-offs and landings, which are often especially challenging with conventional flight control surfaces.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for thrust vectoring a primary fluid flow from a jet engine, the method comprising:
providing a nozzle through which the primary fluid flow flows when existing the jet engine;
forming a flight control surface adjacent a downstream edge of said nozzle, the flight control surface being formed to include an airfoil that projects out beyond a downstream edge of the nozzle;
providing the airfoil with a fixed component and a flap disposed at a downstream end of the fixed component, and coupled pivotally to the fixed component for movement relative to the fixed component, the fixed component being at least partially disposed within the nozzle; and
generating a secondary fluid flow through an interior area of a portion of said airfoil such that said secondary fluid flow flows through at least one opening in said fixed component of the airfoil in a manner to generate a force on a boundary layer of said primary fluid flow flowing over said airfoil and said flap, to controllably enhance and inhibit separation of said primary fluid flow relative to said flap to control thrust vectoring of said primary fluid.

2. The method of claim 1, wherein said generating a secondary fluid flow through at least one opening comprises forming a flight control surface with a plurality of openings through which the secondary fluid flow is able to flow.

3. The method of claim 1, further comprising using an actuator to move said flap of said airfoil, and further disposing said flap such that said flap is located downstream of said downstream edge of said nozzle.

4. The method of claim 1, wherein creating a secondary fluid flow adjacent a surface of said flight control surface comprises generating a pressurized fluid flow tangential to said flight control surface to promote attachment of said primary fluid flow to said flight control surface.

5. The method of claim 1, wherein creating a secondary fluid flow adjacent a surface of said flight control surface comprises generating a pressurized fluid flow directed generally normal to said fixed component of said airfoil, to promote separation of said primary fluid flow from said flap of said airfoil.

6. The method of claim 1, wherein creating a secondary fluid flow adjacent a surface of said flight control surface comprises generating a suction airflow adjacent said flight control surface, to promote separation of said primary flow from said flight control surface.

7. The method of claim 1, wherein creating a secondary fluid flow comprises using at least one slot formed in said fixed component of said airfoil to pass said secondary fluid flow therethrough.

8. The method of claim 1, wherein the operation of forming a flight control surface comprises forming a plurality of openings to form a porous area through which said secondary fluid flow is developed.

9. A method for thrust vectoring a primary fluid flow exiting a nozzle of a jet engine, comprising:
placing an airfoil having a movable flap adjacent a downstream edge of said nozzle such that a fixed component of said airfoil is located partially within said nozzle; and
controlling movement of the flap with an actuating component, said flap being disposed outwardly of the nozzle and downstream of a downstream edge of said fixed component; and
controllably creating a secondary fluid flow adjacent from within an interior area of said fixed component that communicates with an outer surface of said fixed component of said airfoil, such that said secondary fluid flow flows in either one of two directions generally normal to a boundary layer of said primary fluid flow over said outer surface of said flap of said airfoil, to generate forces that are directed non-parallel to a longitudinal axis of said nozzle, that augments both separation and attachment of the boundary layer relative to said flap, to control thrust vectoring of said primary fluid flow.

10. The method of claim 9, wherein creating a secondary fluid flow adjacent a surface of said airfoil comprises generating a pressurized fluid flow through an opening in said outer surface of said airfoil, wherein the pressurized fluid flow is directed tangential to said outer surface of said airfoil to promote attachment of said primary fluid flow to said airfoil.

11. The method of claim 9, wherein creating a secondary fluid flow adjacent said outer surface of said airfoil comprises generating a pressurized fluid flow through an opening in said outer surface that is directed generally normal to said outer surface of said fixed component of said airfoil, to promote separation of said primary fluid flow from said airfoil.

12. The method of claim 9, wherein creating a secondary fluid flow adjacent said outer surface of said airfoil comprises generating a suction force through an opening formed in said outer surface to promote separation of said primary fluid flow from said airfoil.

13. The method of claim 9, wherein creating a secondary fluid flow comprises using at least one slot formed in said fixed component of said airfoil to pass a secondary fluid flow therethrough.

14. A method for thrust vectoring a primary fluid flow from a jet engine, the method comprising:
providing a nozzle through which the primary fluid flow flows when existing the jet engine;
forming a flight control surface adjacent a downstream edge of said nozzle, the flight control surface being formed to include an airfoil that projects out beyond a downstream edge of the nozzle;
providing the airfoil with a fixed component and a flap disposed at a downstream end of the fixed component, and coupled pivotally to the fixed component for movement relative to the fixed component, the fixed component being at least partially disposed within the nozzle; and
generating a secondary fluid flow through an interior area of a portion of said airfoil such that said secondary fluid flow flows through openings in said fixed component of the airfoil in a direction that generates a force on a boundary layer of said primary fluid flow flowing over said airfoil and said flap, to control separation of said boundary layer from said flap, to control thrust vectoring of said primary fluid flow.

* * * * *